United States Patent [19]

Wiley et al.

[11] Patent Number: 4,837,453

[45] Date of Patent: Jun. 6, 1989

[54] SECURITY DEVICE

[75] Inventors: Michael J. Wiley, Chapelizod; Stewart Irving; John P. McKeon, both of Greystones, all of Ireland

[73] Assignee: Inventa Chemicals Limited, Dublin, Ireland

[21] Appl. No.: 936,532

[22] Filed: Nov. 28, 1986

[30] Foreign Application Priority Data

May 31, 1985 [IE] Ireland .................................. 1353/85
Feb. 13, 1986 [IE] Ireland .................................. 397/86

[51] Int. Cl.⁴ ........................ B62D 45/00; B60R 25/04
[52] U.S. Cl. ..................................... 307/10.2; 70/241; 200/61.67; 292/297
[58] Field of Search .............. 307/10 AT; 340/63, 64; 70/241, 240, 237; 116/94; 292/297, 290, 292; 200/61.67; 180/114

[56] References Cited

U.S. PATENT DOCUMENTS

| | | | |
|---|---|---|---|
| 2,756,085 | 7/1956 | Hochstadt | 70/241 |
| 3,538,725 | 11/1970 | Guenther et al. | 70/241 |
| 3,548,373 | 12/1970 | Rivera et al. | 307/10 AT X |
| 3,611,287 | 10/1971 | Hoff | 70/241 |
| 3,744,285 | 7/1973 | Barmherzig | 70/241 |
| 3,820,361 | 6/1974 | Leitner | 307/10 AT X |
| 3,831,409 | 8/1974 | Gebhard et al. | 70/241 |
| 3,969,596 | 7/1976 | Siegel | 307/10 AT X |
| 4,099,593 | 7/1978 | Schultz | 70/241 X |
| 4,102,164 | 7/1978 | Barbust | 70/241 |
| 4,157,478 | 6/1979 | Quinton | 307/10 AT |
| 4,233,642 | 11/1980 | Ellsberg | 70/241 X |
| 4,410,775 | 10/1983 | Howard | 307/10 AT X |
| 4,430,685 | 2/1984 | Ellsberg | 307/10 AT X |
| 4,515,237 | 5/1985 | Gonzalez | 307/10 AT X |
| 4,595,903 | 6/1986 | Arlasky et al. | 307/10 AT X |

Primary Examiner—William M. Shoop, Jr.
Assistant Examiner—Sharon D. Logan
Attorney, Agent, or Firm—Klein & Vibber

[57] ABSTRACT

A security device for locking the cable of a bonnet lock of a car comprising a housing with cable inlets. The inner core of the cable is secured to a cable engaging member which is movable within the housing on a pivot member about a pivot pin. A solenoid spindle mounted on the pivot member engages a bracket mounted on the housing to prevent pivotal movement of the cable engaging member. A compression spring biases the spindle into engagement with the bracket on de-energizing of the solenoid to lock the cable.

13 Claims, 3 Drawing Sheets

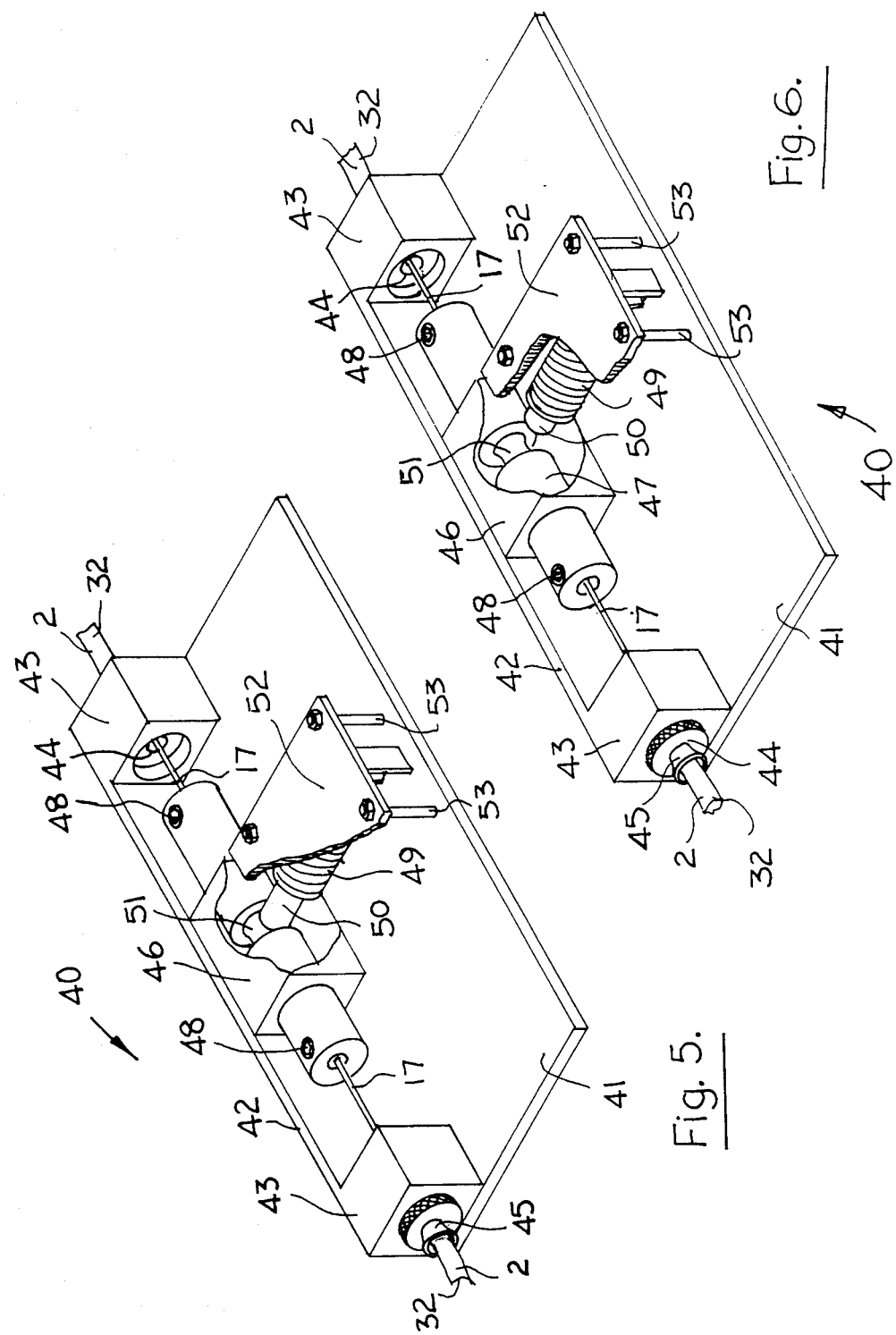

SECURITY DEVICE

BACKGROUND TO THE INVENTION

1. Field of the Invention

The present invention relates to a security device, and in particular to a security device for rendering a cable inoperative for fitting to a car, motor bike, bicycle and the like to prevent theft. For example, it may be fitted to a bonnet lock cable or the like.

2. Discussion of the Prior Art

Essentially, there are two types of security devices for use in cars, motor cycles and the like. Firstly, there is the visible type, for example, chains, steering locks and the like, and secondly, there are alarm devices which are activated if an attempt is made to enter the vehicle or to start it. The first type suffer from the disadvantage that they can readily easily be seen, and in general, it is not too difficult to either saw, cut through, or bend these devices, so that they can be removed, thereby permitting the thief to drive off in the car or motor bike, as the case may be. The second type, namely, the alarm type, suffer from a number of problems, and in particular, they very often can be inadvertently activated, when the owner isn't present, and may continue to alarm until the owner returns, thereby, in many cases, causing a flat battery. Further, alarm devices are relatively difficult and expensive to fit, and may be successfully by-passed by a determined burglar.

Only some of these devices tend to prevent or make it difficult to gain access to the passenger compartment of a car or other such vehicle, and indeed, some do not prevent access at all. However, in general, there is no suitable or satisfactory device or apparatus which adequately secures the bonnet of a car. It will be appreciated that the components beneath the bonnet of a car can, in many cases, be valuable and are very often a target for thieves. For example, the battery is, in general, mounted under the bonnet of a car, and this is very commonly a target for thieves. Other easily removed components on the engine are also targets for thieves.

There is therefore a need for a security device for a car or other road vehicle which prevents access through the bonnet of a car. Indeed, there is a need for a security device which is also effective in preventing theft of vehicles, such as cars, lorries, motorcycles, bicycles and the like.

OBJECTS OF THE INVENTION

One object of the invention is to provide a security device for a car or other vehicle. Another object of the invention is to provide a security device for preventing unauthorised access to the bonnet of a car or other vehicle. A further object of the invention is to provide a security device for mounting on a cable which renders the cable inoperative. For example, a device which could be mounted to a bonnet lock cable, a clutch cable, handbrake cable, or indeed any other cable, whether on a car, lorry or any other vehicle, or indeed, in certain cases, on a bicycle, motorbike or the like. A further object of the invention is to provide a security device which is relatively easily and inexpensively manufactured. It is also an object of the invention to provide a security device which can readily easily and inexpensively be fitted to a cable of a car, lorry, van or other vehicle, motorbike, bicycle or the like.

Another object of the invention is to provide a security device for locking a cable which can be mounted into an alarm system fitted to a car or other vehicle.

SUMMARY OF THE INVENTION

According to the invention, there is provided a security device for rendering a mechanical cable inoperative, the device comprising a housing, a cable engaging member for engaging the cable, and movable in the housing, stop means movable from a locking position preventing movement of the cable engaging member to a release position permitting movement of the cable engaging member.

In one embodiment of the invention, the cable engaging member is mounted on a pivotal member pivotally mounted in the housing. Preferably, the pivotal member is an elongated member, one end of which is pivotally connected to the housing, and the other end supporting the cable engaging member. Advantageously, the stop means is mounted on the pivotal member, and engageable with the housing in the locking position. Preferably, the stop means is provided by a solenoid operated spindle.

Alternatively, the cable engaging member comprises engagement means engageable with the stop means to prevent movement of the cable engaging member. Preferably, the engagement means is provided by a recess adapted to engage the solenoid spindle. Advantageously, the cable engaging member is slidable in a mounting block mounted in the housing, and the solenoid spindle is slidable transversely in the mounting block to engage the recess.

Additionally, the invention provides a cable incorporating the security device according to the invention.

Furthermore, the invention provides a bonnet locking mechanism comprising a locking means for the bonnet operable by a cable, and the security device of the invention connected to the cable.

Additionally, the invention provides a vehicle alarm comprising the security device of the invention, wherein the solenoid is activated by an electrical circuit of the vehicle alarm.

ADVANTAGES OF THE INVENTION

The advantages of the invention are many. One particularly important advantage is that the invention provides a security device for a car, lorry, or any other vehicle, motorbike, bicylce or the like, which is particularly effective against thieves. Where the security device is mounted on the cable of the bonnet lock of a car or other vehicle, it provides effective means for securing the bonnet to prevent unauthorized access to the components of the vehicle mounted beneath the bonnet. Another important advantage of the invention is that it is relatively easily and inexpensively manufactured. A further advantage of the invention is that it is readily easily and inexpensively fitted to a cable, whether it be a cable of a car bonnet, a clutch cable, a brake cable, a throttle cable, or indeed any other cable, either of a car, vehicle, motorbike, bicycle or the like. A further advantage of the invention is that it can readily easily be connected into an existing alarm system of a car or any other vehicle.

These and other objects and advantages of the invention will be readily apparent to those skilled in the art, from the following description of some preferred embodiments thereof, which are given by way of example only, with reference to the accompanying drawings, in which:

BRIEF DESCRIPTION OF THE DRAWINGS

FIG. 5 is a partly cut-away perspective view of a device according to another embodiment of the invention, and FIG. 6 is a partly cut-away perspective view of the device of FIG. 5 in a different position.

DETAILED DESCRIPTION OF THE INVENTION

Figure 1:
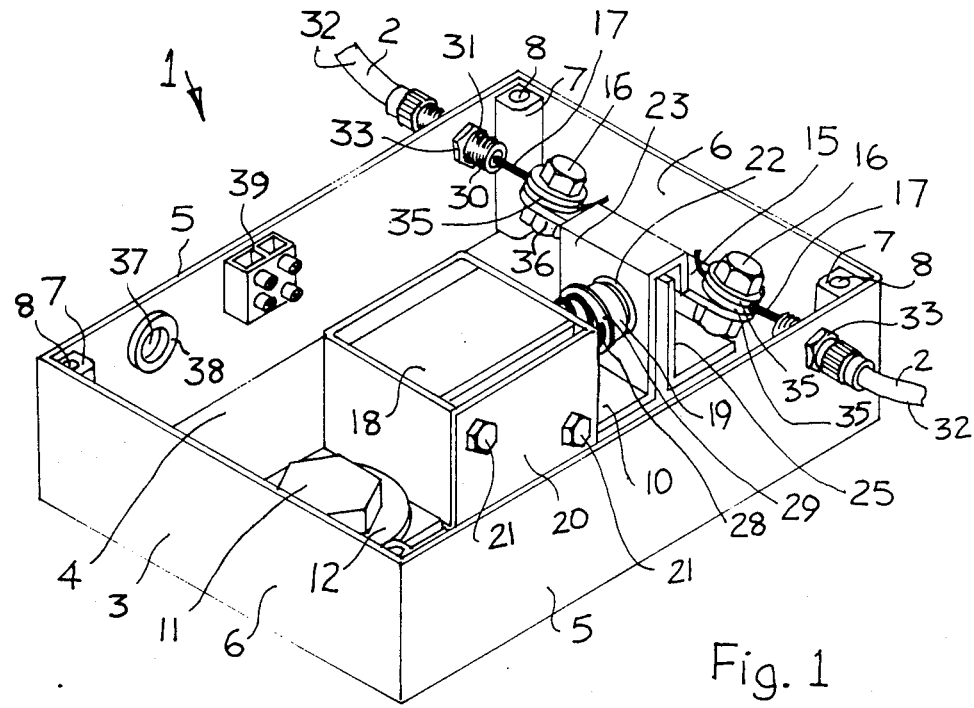
FIG. 1 is a perspective view of the security device according to the invention.
Figure 3:
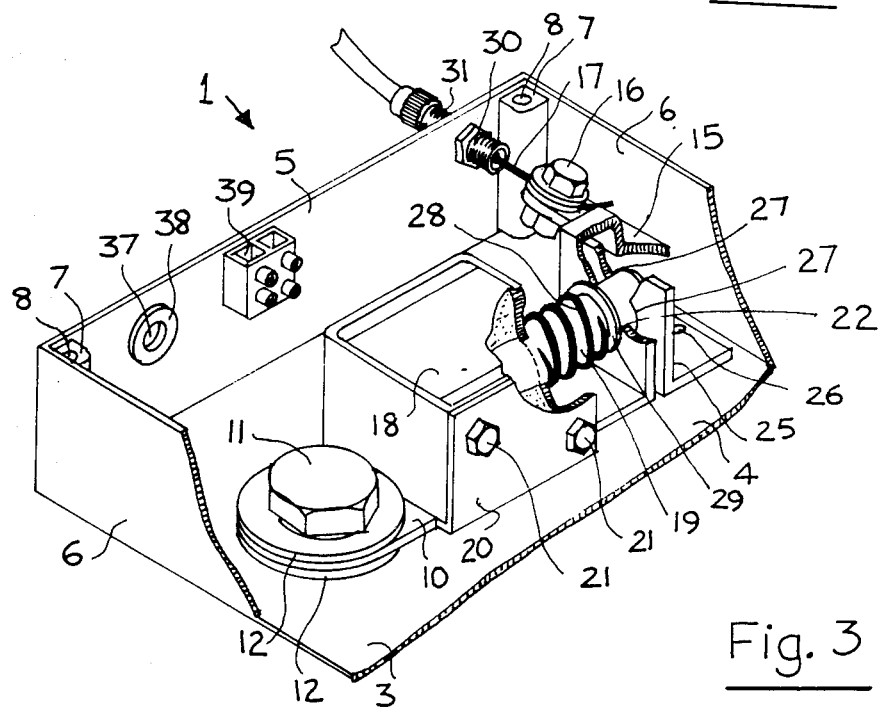
FIG. 3 is a partly cut-away perspective view of the device of FIG. 1.
Figure 2:
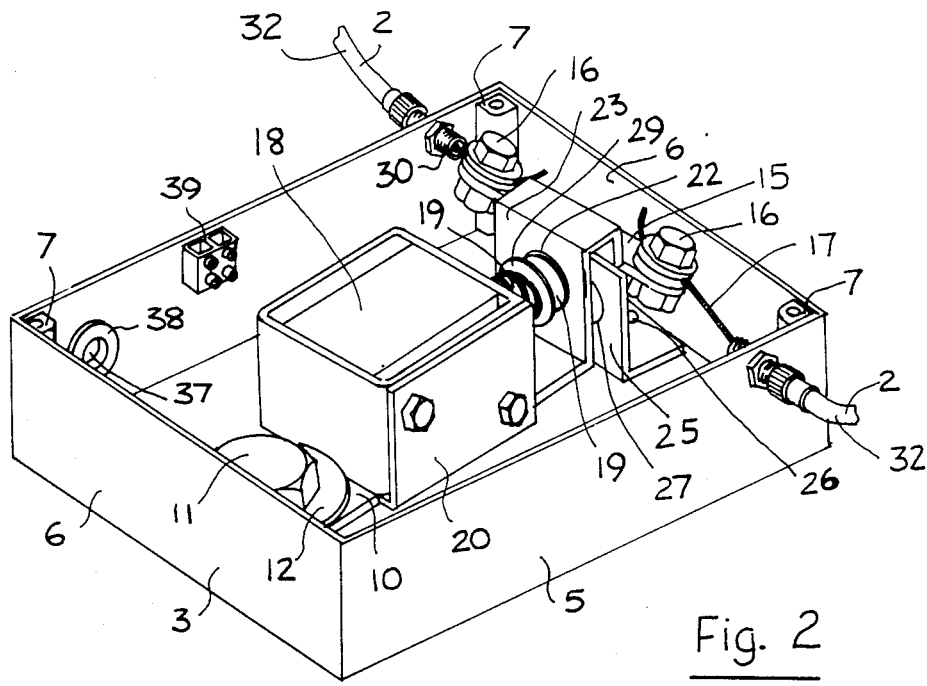
FIG. 2 is a perspective view of the security device of FIG. 1 illustrating portion of the device in a different position.
Figure 4:
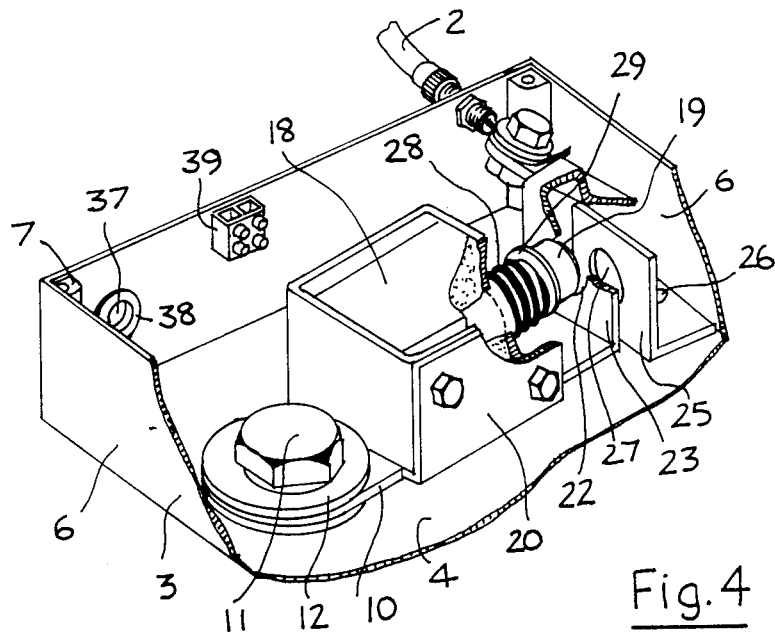
FIG. 4 is a partly cut-away perspective view of the device of FIG. 1 in the position of FIG. 2.

Referring to the drawings, and initially to FIGS. 1 to 4, there is illustrated a security device according to the invention indicated generally by the reference numeral 1 for rendering a cable 2 inoperative. In this particular embodiment of the invention, the device is mounted in the cable for operating the latch (not shown) of a bonnet lock, (also not shown) of a car. The device 1 comprises a housing 3 having a base 4, side walls 5 and end walls 6 pressed from sheet metal. Four corner members 7 are provided to support the side and end walls 5 and 6 threaded holes 8 in the corner member 7 receive screws (not shown) to secure a lid (also not shown) and of sheet metal.

A pivotal member 10 formed of a sheet metal pressing is pivotally mounted at one end on the base 4 by a pivot pin 11. Washers 12 accommodate pivotal movement of the member 10. A cable engaging member 15 is formed on the other end of the pivotal member 10 and receiving screws 16 on the cable engaging member 15 receive the inner core 17 of the cable 2 as will be described below. Because the pivot member 10 is pivotal, the cable engaging member 15 is therefore movable from side to side in the housing 3 to permit operation of the cable 2.

However, a stop means, in this case provided by a solenoid 18 with a spindle 19 is mounted on the pivot member 10 to prevent movement of the cable engaging member 15. An upstanding bracket 20 extending upwardly from the pivot member 10 supports the solenoid 18 and screws 21 secure the solenoid to the bracket 20. An opening 22 is provided in an upstanding portion 23 of the pivot member 10 to accommodate the spindle 19. A bracket 25 secured to the base 4 by rivets 26 is provided with an opening 27 to receive the spindle 19 of the solenoid 18. Thus, when the spindle 19 engages the bracket 25, the pivot member 10 and in turn the cable engaging member 15 is locked and prevented from moving. Releasing the spindle 19 from the bracket 25 permits pivotal movement of the member 10 and in turn the cable engaging member 15. A compression spring 28 bearing between the solenoid 18 and a washer 29 biases the spindle 19 towards the bracket 25.

A pair of cable inlets 30 are provided on each side wall 5 to accommodate the cable 2. Each inlet 30 comprises an adjustable member 31 which engage the outer sleeve 32 of the cable 2. Threaded holes (not shown) in the side walls 5 engage the adjustable members 31 and nuts 33 are provided to lock the adjustable members 31 in any desired position. The inner core 17 of the cable is fed through the adjustable member 31 to engage the receiving screws 16 on the cable engaging member 15. Such screws will be well known to those skilled in the art. Essentially, each screw 16 comprises a transverse hole (not shown) to receive the cable core 17. Washers 35 are provided to clamp the cable core 17 in the transverse hole when a nut 36 is tightened.

A cable inlet 37 is provided in one of the side walls 5 and protected by a grommet 38 to accommodate an electrical cable to deliver power to the solenoid 18. A cable terminal block 39 is provided on the side wall 5 for connecting the incoming electrical cable. An electrical cable (not shown) is connected between the terminal block 39 and the solenoid 18.

In use, the security device 1 is mounted in an appropriate position on a bulkhead beneath the bonnet of a car. Usually, it would be mounted on a bulkhead adjacent the front wing of a car in the path of the bonnet locking cable 2. The cable is then cut at an appropriate position, and part of the outer sleeve 32 is stripped back from the cable. The two cut ends of the cable are engaged in the adjustable members 31 and the inner cores 17 are secured to the cable engaging member 15 by the receiving screws 16. The adjusting members 31 are adjusted until the cable is correctly operating the bonnet latch. An electrical cable from a suitable control circuit is connected into the terminal block 39 to operate the solenoid. When the solenoid 18 is energized, the spindle 19 is withdrawn, and thus disengages the brackets 25. In this position, the cable 2 is operative. This would normally be when the car is not locked, or the ignition switched on. When the solenoid is de-energized the spindle engages the bracket 25 under the action of the spring 28.

It is envisaged that, in general, the security device 1 will be connected into an alarm circuit. Thus, when the alarm has been deactivated, the alarm control circuit would operate a relay (not shown) which, in turn, would energize the solenoid, thereby releasing the spindle 19 from the bracket 25. Conversely, when the alarm circuit is activated, and the alarm set, the relay (not shown) would de-energize the solenoid, thereby allowing the spindle under the spring biasing of the compression spring 28 to engage the bracket 25, rendering the cable 2 inoperative. It is envisaged that the device 1 may be connected into an alarm circuit which would normally be activated by keying in a personal identification number into a keypad. The alarm circuit would have storing means to store a personal identification number and also would have comparing means to compare the keyed in number with the stored number. In general, it is envisaged that both the storing means and comparing means would be provided by a microprocessor. Such alarm systems will be known to those skilled in the art, and it is not intended to describe it in further detail. Further, it is envisaged that the alarm system would also deactivate the ignition circuit of the vehicle.

Referring now to FIGS. 5 and 6 there is illustrated a security device according to another embodiment of the invention. In this case, the device is indicated by the reference numeral 40, and is also for rendering a bonnet cable 2 inoperative. This device 40 comprises a base 41, with a side wall 42. A pair of end brackets 43 form cable inlets 44 for the cable 2. Adjusting members 45 similar to the members 31 are provided in the brackets 43. A mounting block 46 slidably supports a cable engaging member 47 and grub screws 48 in each end of the cable engaging member 47 secure the inner core 17 of the cable 2. A stop means provided by a solenoid 49 and spindle 50 which engages a receiving means, namely, an annular recess 51 in the cable engaging member 47, to render the cable 2 inoperative. The spindle 50 is slidable in the mounting block 46 transversely of the cable engaging member 47 to engage the recess 51. The solenoid 49 is supported on a support plate 52, which is mounted on mounting screws 53 to the base 41. A compression spring (not shown) is provided to bias the spindle 52 into engagement with the recess 51 when the solenoid has been deactivated.

The operation of this device is substantially similar to the operation of the device 1. While the solenoid 49 is energised, the spindle 52 is retained out of engagement with the recess 51, and accordingly, the cable engaging member 47 and the cable 2 is operative. To lock the cable, the solenoid 49 is de-energised, and the spindle 50 under the spring biasing engages the recess 51.

It is envisaged that this device 40 may be connected into an alarm system of a car or other such vehicle.

It will be appreciated that while in both embodiments of the invention the security device has been described for locking a bonnet lock cable, it could be used for rendering any cable inoperative, for example, a hand brake cable, a clutch cable, a throttle cable, or indeed any other cable. Needless to say, it is envisaged that the device, as well as being suitable for use in a car, could be used on a motor bike or the like, similarly for locking any desired cable. In fact, in certain cases, it is envisaged that the security device may be used on a bicycle.

It will also be appreciated that while the solenoid has been described as engaging a recess in the cable engaging member of the embodiment of the invention described with reference to FIGS. 5 and 6, the solenoid could engage any suitable engagement means other than a recess. For example, in certain cases, it is envisaged that a transverse hole may be provided in the cable engaging member or any other type of recess.

Further, it is envisaged in certain cases that instead of mounting the device intermediate the ends of the cable, it could be mounted to one or other end of the cable. For example, it may be mounted adjacent the bonnet lock latch, in which case it would not be necessary to cut the cable, merely all that would be required would be to strip portion of the outer sleeve of the cable and pass the inner cable directly through the device without the need for cutting it. However, needless to say, the cable would be secured to the cable engaging member.

Needless to say, while the security device has been described as being controlled by an electrical control circuit of an alarm system, it could be controlled by any suitable electrical circuit. In fact, it is envisaged in certain cases, it may be controlled directly from the ignition switch, or indeed it could be controlled from one of the door locks of the vehicle, or it could be controlled by a separate independent control circuit.

Needless to say, while the stop means has been described as being a spindle operated by a solenoid any other suitable stop means could be used. It will be appreciated that means other than a solenoid could be used for operating the stop means.

Where an independent electrical circuit is used to control the device, it is envisaged that a suitable activating and deactivating means could be provided. Such an activating and deactivating means could be a keypad, a tumbler lock which would operate an electrical switch, or indeed, an ordinary toggle switch. In which case, it is envisaged that the switch would be provided in a concealed location.

It will of, course be appreciated that while particular constructions of housing have been described, any other suitable construction of housing could be used without departing from the scope of the invention. Needless to say, other suitable cable inlets could be used with the housing without departing from the scope of the invention.

Further, while the solenoid has been described as being controlled through a relay, this is not necessary, it could be controlled directly if desired. Further, transistor switching or transistor relays could also be used to control the solenoid.

It is also envisaged that a standby battery may be provided to power the device to guard against the failure or removal of the vehicle battery.

Furthermore, while the cable engaging member of the device of FIGS. 1 to 4 has been described as being pivotally mounted, while in this particular embodiment of the invention, pivot mounting is preferable, it is not essential, the cable engaging member may be slidably mounted or mounted to move in any other suitable manner. Needless to say, it will be appreciated while in the embodiment of the invention described with reference to FIGS. 1 to 4, the solenoid and spindle have been mounted effectively on or with the cable engaging member, the solenoid could be mounted on the housing and engagable with any suitable engaging means on the cable engaging member. Similarly, in the case of the embodiment of the invention described with reference to FIGS. 5 and 6, the solenoid may be mounted on the cable engaging member and engagable with the housing.

I claim:

1. A security device for rendering a mechanical cable inoperative, the device comprising
   a housing,
   a pivotal member pivotally mounted in the housing,
   a cable engaging member for engaging the cable, the cable engaging member being mounted on the pivotal member and constrained to move with the pivotal member, and
   stop means mounted on the pivotal member and being movable from a locking position preventing movement of the cable engaging member to a release position permitting movement of the cable engaging member.

2. A security device as claimed in claim 1 in which the pivotal member is an elongated member, one end of which is pivotally connected to the housing, and the other end supporting the cable engaging member.

3. A security device as claimed in claim 1 in which the stop means is engagable with the housing in the locking position.

4. A security device as claimed in claim 1 in which the stop means is provided by a solenoid operated spindle.

5. A security device as claimed in claim 4 in which the housing is provided with accommodating means, and the solenoid spindle engages the accommodating means.

6. A security device as claimed in claim 5 in which an upstanding member extends upwardly from the elongated pivotal member, the upstanding member having an opening therethrough to slidably engage the solenoid spindle, and a bracket extending upwardly from the housing adjacent the upstanding member of the pivotal member, the bracket having a corresponding opening therethrough to engage the solenoid spindle in the locking position.

7. A security device as claimed in claim 1 in which a pair of spaced apart cable inlets are provided in the housing on opposing sides of the cable engaging member to permit entry of the cable into the housing, the cable inlets being adapted to engage the outer sleeve of the cable.

8. A security device as claimed in claim 7 in which the housing comprises a base having four upstanding side members and a releasably mounted lid engagable with the side members, the cable inlets being provided in a pair of opposing side members.

9. A security device as claimed in claim 4 in which the solenoid spindle is spring biased into the locking position, and activation of the solenoid moves the solenoid spindle into the release position.

10. A vehicle alarm system comprising the security device of claim 1 wherein the solenoid is activated by an electric circuit of the vehicle alarm.

11. A vehicle alarm as claimed in claim 10 in which the alarm is activated by a keypad.

12. A vehicle alarm as claimed in claim 11 in which the electric circuit of the vehicle alarm comprises memory means to store a personal identification number, and means to compare a number entered through the keypad with the personal identification number.

13. A vehicle alarm as claimed in claim 12 in which the vehicle alarm comprises means to deactivate the ignition circuit of the car.

* * * * *